United States Patent
Andersen (12) 
(10) Patent No.: US 6,431,611 B1
(45) Date of Patent: Aug. 13, 2002

(54) TWO PIECE UNIVERSAL ELBOW

(75) Inventor: John L. Andersen, Jacksonville, TX (US)

(73) Assignee: Builder's Best, Inc., Jacksonville, TX (US)

(*) Notice: Subject to any disclaimer, the term of this patent is extended or adjusted under 35 U.S.C. 154(b) by 0 days.

(21) Appl. No.: 09/325,330

(22) Filed: Jun. 3, 1999

(51) Int. Cl.$^7$ .............................................. F16L 43/00
(52) U.S. Cl. ................... 285/183; 285/179.2; 285/181; 285/145.1
(58) Field of Search .................. 285/183, 179, 285/179.2, 181, 145.1, 147.1; D23/393, 262, 263, 394; 454/339

(56) References Cited

U.S. PATENT DOCUMENTS

| | | | |
|---|---|---|---|
| 290,045 A | | 12/1883 | Hardy |
| 1,457,126 A | | 5/1923 | Scherer |
| 1,881,679 A | | 10/1932 | Klomparens ................ 285/198 |
| 2,874,980 A | * | 2/1959 | Browning .................... 285/189 |
| D218,825 S | | 9/1970 | Blumer ............................ D23/1 |
| 3,892,049 A | | 7/1975 | Adams, Jr. .................... 34/235 |
| 3,988,030 A | * | 10/1976 | Twedell ........................ 285/183 |
| 5,066,050 A | | 11/1991 | Kretchman .................. 285/319 |
| 5,121,948 A | * | 6/1992 | Anderson et al. ........... 285/168 |
| 5,158,328 A | | 10/1992 | Anderson .................... 285/168 |
| D335,174 S | * | 4/1993 | Anderson et al. .......... D23/393 |
| 5,199,190 A | * | 4/1993 | Mayer et al. .................. 34/235 |
| D342,130 S | | 12/1993 | Anderson .................... D23/393 |
| D342,782 S | | 12/1993 | Anderson .................... D23/393 |
| 5,645,482 A | * | 7/1997 | Moss et al. .................. 454/339 |
| D412,030 S | * | 7/1999 | Tuggle ........................ D23/393 |
| D421,644 S | * | 3/2000 | Andersen .................... D23/263 |
| D425,612 S | * | 5/2000 | Andersen .................... D23/393 |

OTHER PUBLICATIONS

Sep. 1997 Lambro Brochure.
Sep. 1997 Lambro Catalog (Cover and p. 12).

* cited by examiner

*Primary Examiner*—Teri Pham Luu
(74) *Attorney, Agent, or Firm*—Price, Heneveld, Cooper, DeWitt & Litton

(57) ABSTRACT

An air duct fitting comprising a rectangular cross section duct segment having a central axis, a round cross section duct segment having a central axis, and a transition rectangle-to-round segment, the rectangular cross section duct segment having a lateral round opening with a central axis transverse to the rectangular duct segment central axis, the round cross section duct segment central axis being laterally offset from and parallel to the rectangular duct segment central axis. The transition segment is removably interfitted with the rectangular cross section duct segment, whereby the rectangular cross section duct segment round opening can be oriented in either of two opposite directions, one in a plane in general alignment with the round cross section duct segment central axis and the other in a plane laterally offset from the round cross section duct segment central axis.

20 Claims, 6 Drawing Sheets

Fig. 20

TWO PIECE UNIVERSAL ELBOW

BACKGROUND OF THE INVENTION

This invention relates to air duct fittings and air duct assemblies employing the fittings.

Figure 16:
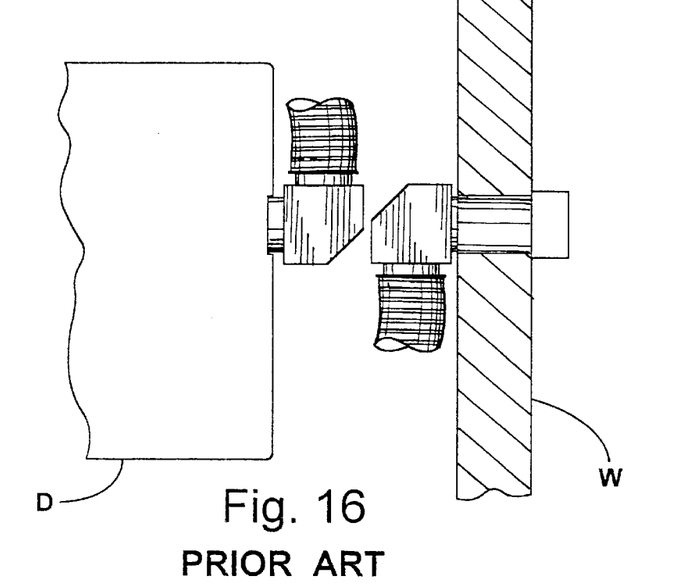
FIG. 16 is a plan view of a prior art assembly.

A variety of specialized metal, air flow duct fittings have been developed in recent years. These are especially suited to hot air discharge from clothes dryers. The flexible air discharge duct from clothes dryers is typically four inches in diameter. Yet, the fittings for the dryer outlet to the duct and the duct to the wall tailpipe often require substantially more spacing than this, especially if the dryer outlet and tailpipe are relatively close together, as shown for example in FIG. 16. The fittings are typically of metal. Further, although the novel fittings can be employed in combination with flexible polymeric hose or rigid pipe, they are preferably used in combination with flexible metal duct for safety and convenience.

The fittings which have been developed over recent years include the offset elbow of U.S. Pat. No. D 342,130, and close elbow of U.S. Pat. Nos. 5,158,328 and D 342,782. A close elbow is commonly used for a flush connection. An offset elbow is commonly used for an offset connection. Other fittings include a short periscope and a scissor adapter. These fittings are highly advantageous and are in widespread use by clothes dryer manufacturers and installers. Unfortunately, installers never know what conditions they will find until they get to the home, so they must take several fittings of various types with them.

There is need in this field or industry for a fitting that could replace at least some of these prior fittings, to minimize manufacturing, inventory and separate storage and stocking of multiple types of fittings, to minimize the number of fittings installers must carry, and to lessen the installation time required. There is also a need for such a special fitting which would enable a dryer to be placed only just slightly more than four inches from the wall, even if the dryer outlet and the wall tailpipe are close together.

SUMMARY OF THE INVENTION

An object of this invention is to fill these needs, i.e., replace at least some of the variety of prior type fittings, to thereby minimize manufacturing inventory and separate storage and stocking of multiple type fittings, to minimize installers inventory, require less installation time, and enable a dryer to be placed just slightly more than four inches from the wall when accommodating a four inch dryer outlet duct.

The novel fitting has a rectangular cross section duct segment and a round cross section duct segment, both having a central axis, and a transition rectangle-to-round segment between them. The central axes of the rectangular segment and the round segment are laterally offset from each other but parallel to each other, and the rectangular segment has a lateral opening, the rectangular section being dimensioned preferably about two inches by six inches in dimension to have substantially equal air flow to that of the standard round segment four inches in diameter, by maintaining about the same cross section area of about twelve square inches.

The component may be used singly or doubly in an air duct assembly.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 13:
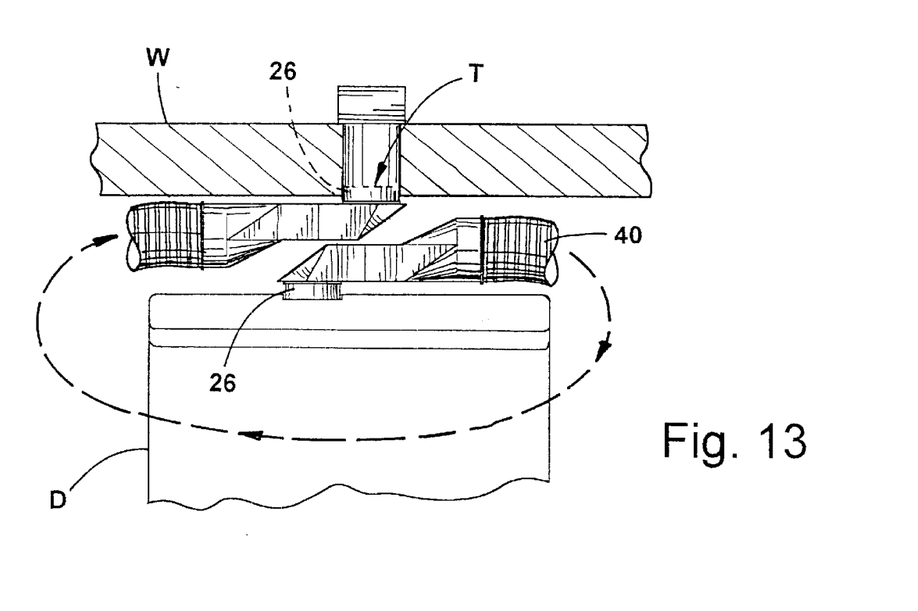
FIG. 13 is a top plan view of a novel fitting and duct assembly interconnected with a clothes dryer outlet and a wall tail piece.
Figure 14:
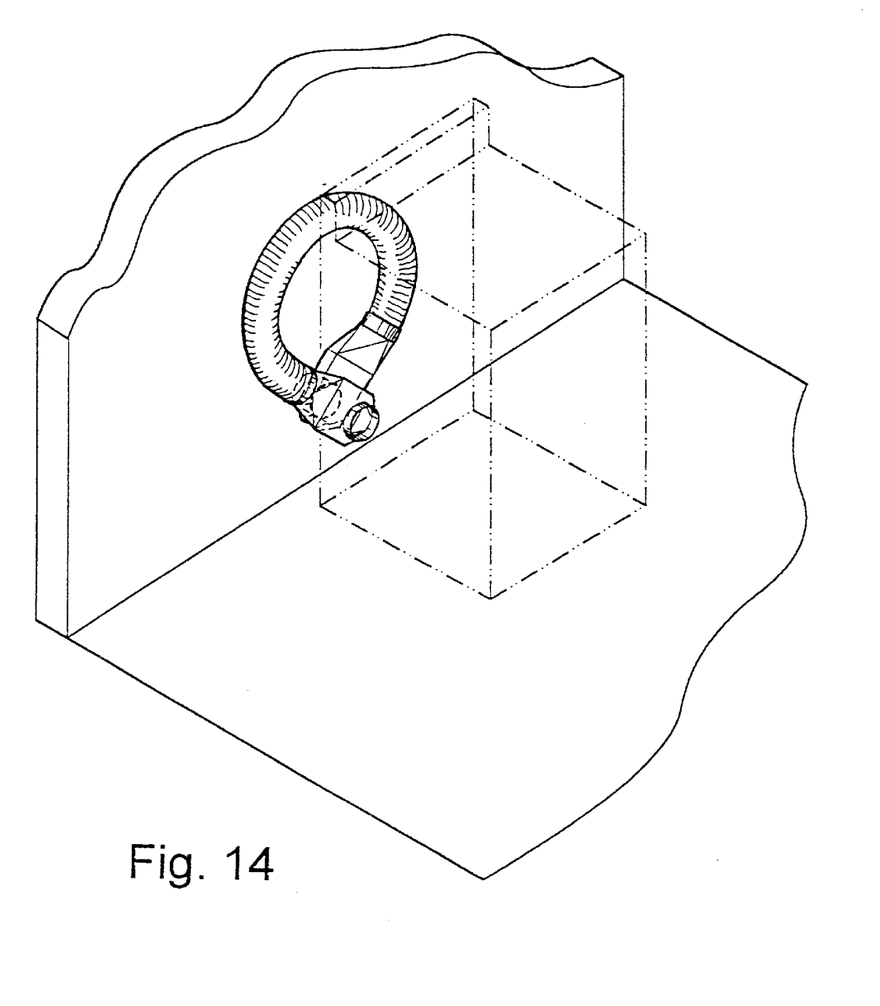
FIG. 14 is a perspective view of the assembly in FIG. 13.
Figure 15:
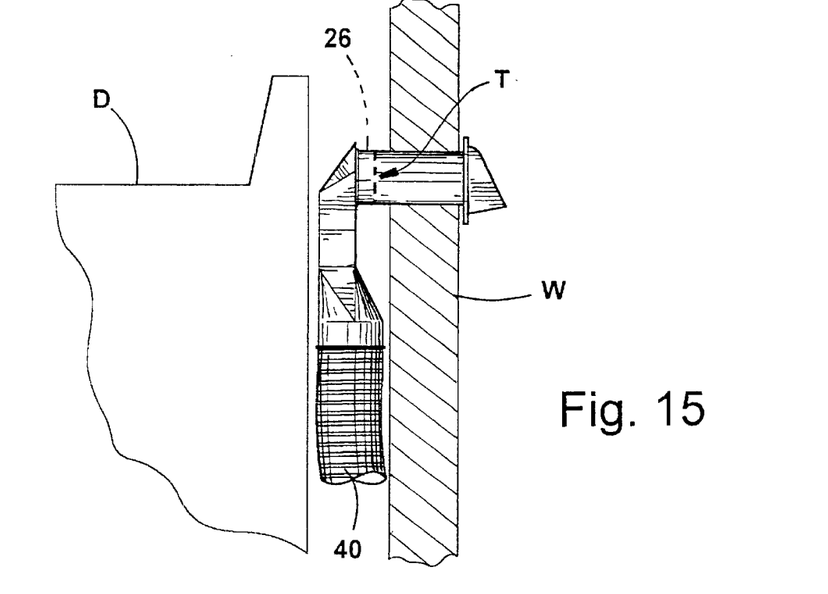
FIG. 15 is a plan view of a second novel fitting assembly on the back of a dryer adjacent a wall.

Referring now specifically to the drawings, in FIGS. 1–6 is shown one arrangement of the novel fitting; FIGS. 7–12 show a second arrangement of the novel fitting; and FIGS. 13–15 show novel fitting and flexible duct assemblies.

Referring first then to FIGS. 1–6, fitting 10 is shown to include a rectangular cross section duct segment 12, a round cross section duct segment 14, and a transition duct segment 16 therebetween. Rectangular cross section duct segment 12 includes a pair of opposite parallel walls 20 and a second pair of opposite parallel walls 22, these four walls defining a rectangle in cross section. Typically the product will be used with a four inch diameter round duct. To optimize air flow with respect to the four inch round duct, it is desirable to have the rectangular cross section be two inches by six inches in width. Thus, walls 20 are narrow, while walls 22 are wider, having a width preferably three times that of the width of walls 20. In the normal arrangement, therefore, this rectangular cross section duct segment constitutes a segment of about 2"×6", i.e., walls 20 being about two inches wide and walls 22 being about six inches wide. At one end of rectangular cross section segment 12 is a lateral circular outlet opening 24 and a circumferential collar 26 around this opening 24, both having a central axis normal to the elongated axis of the rectangular segment. The end 28 of duct segment 12 is tapered toward this opening 24 to cause the air flow through the fitting to change directions 90° smoothly. Opening 24 is preferably about four inches in diameter. Side walls 20 preferably also taper inwardly at 20'.

Figure 1:
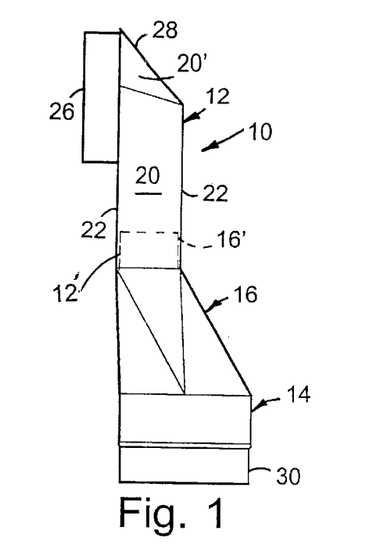
FIG. 1 is a side elevational view of the novel fitting shown in one orientation.
Figure 2:
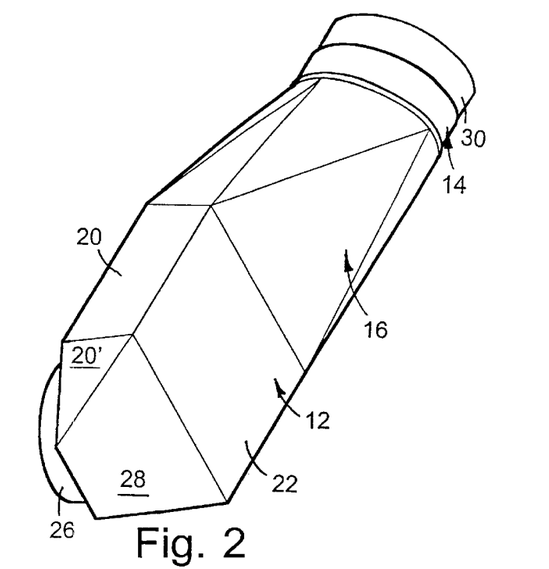
FIG. 2 is a perspective view of the fitting in FIG. 1.
Figure 3:
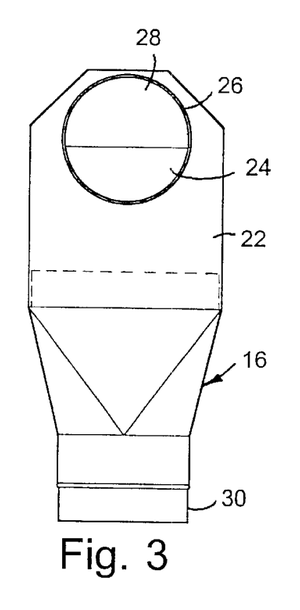
FIG. 3 is an elevational view of the left side of FIG. 1.
Figure 4:
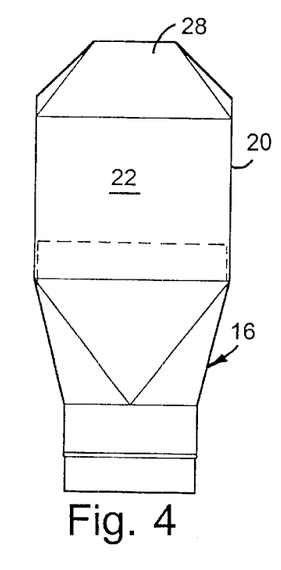
FIG. 4 is an elevational view of the right side of FIG. 1.
Figure 5:
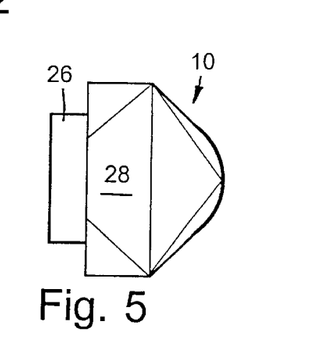
FIG. 5 is a top plan view of the fitting in FIG. 1.
Figure 6:
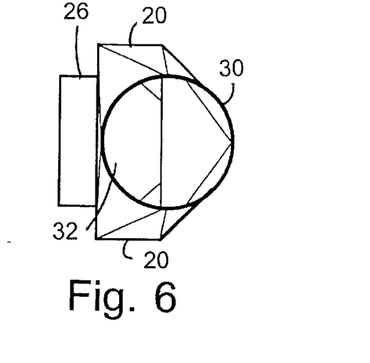
FIG. 6 is a bottom view of the fitting in FIG. 1.
Figure 7:
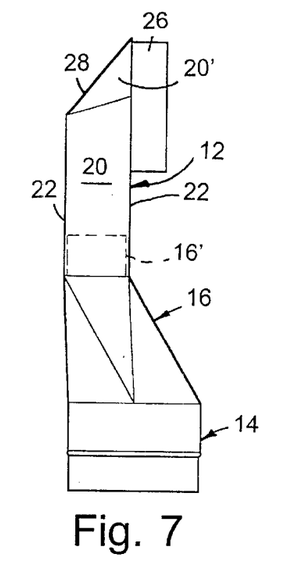
FIG. 7 is a side elevational view of the fitting shown in an alternative arrangement of its components.
Figure 8:
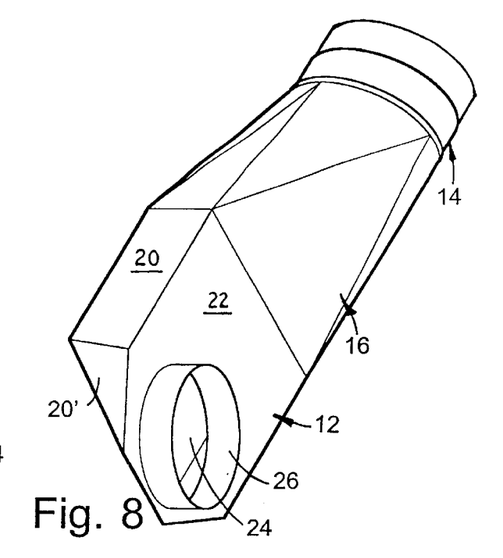
FIG. 8 is a perspective view of the fitting in FIG. 7.
Figure 9:
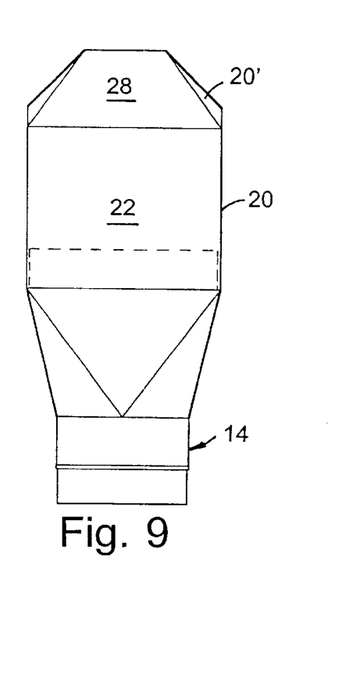
FIG. 9 is a side elevational view of the left side of FIG. 7.
Figure 10:
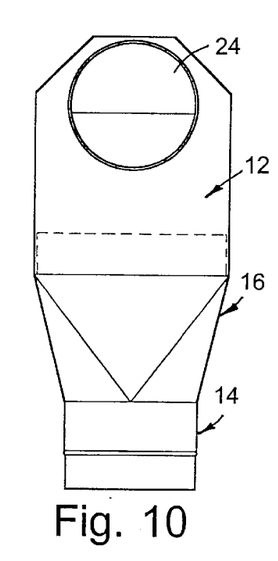
FIG. 10 is a side elevational view of the right side of FIG. 7.
Figure 11:
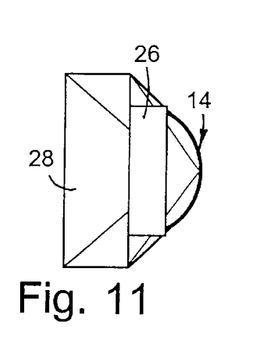
FIG. 11 is a top plan view of the fitting in FIG. 7.
Figure 12:
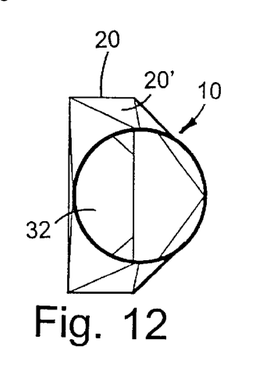
FIG. 12 is a bottom view of the fitting in FIG. 7.

Round or circular cross section duct segment 14 is shown to have at its free end an optional circular collar 30 defining a round passageway 32 (FIG. 6). Transition segment 16 has one end which is circular in cross section coincident with the round wall of round segment 14, and an opposite end 16' which defines a rectangular opening coincident with the rectangular dimensions of segment 12.

Round segment 14 has a central axis. Rectangular segment 12 has a central axis. The rectangular segment is shown laterally offset from the round segment such that the central axis of rectangular segment 12 is offset from but parallel to the central axis of round segment 14. This is preferred, and with the central axis of round segment 14 generally in the plane of one wall 22 of rectangular segment 12. Thus, one wall 22 of the rectangular segment is generally aligned with the diameter of circular segment 14 while the opposite wall 22 is aligned with the central axis of circular segment 14.

Figures 18, 19, 20:
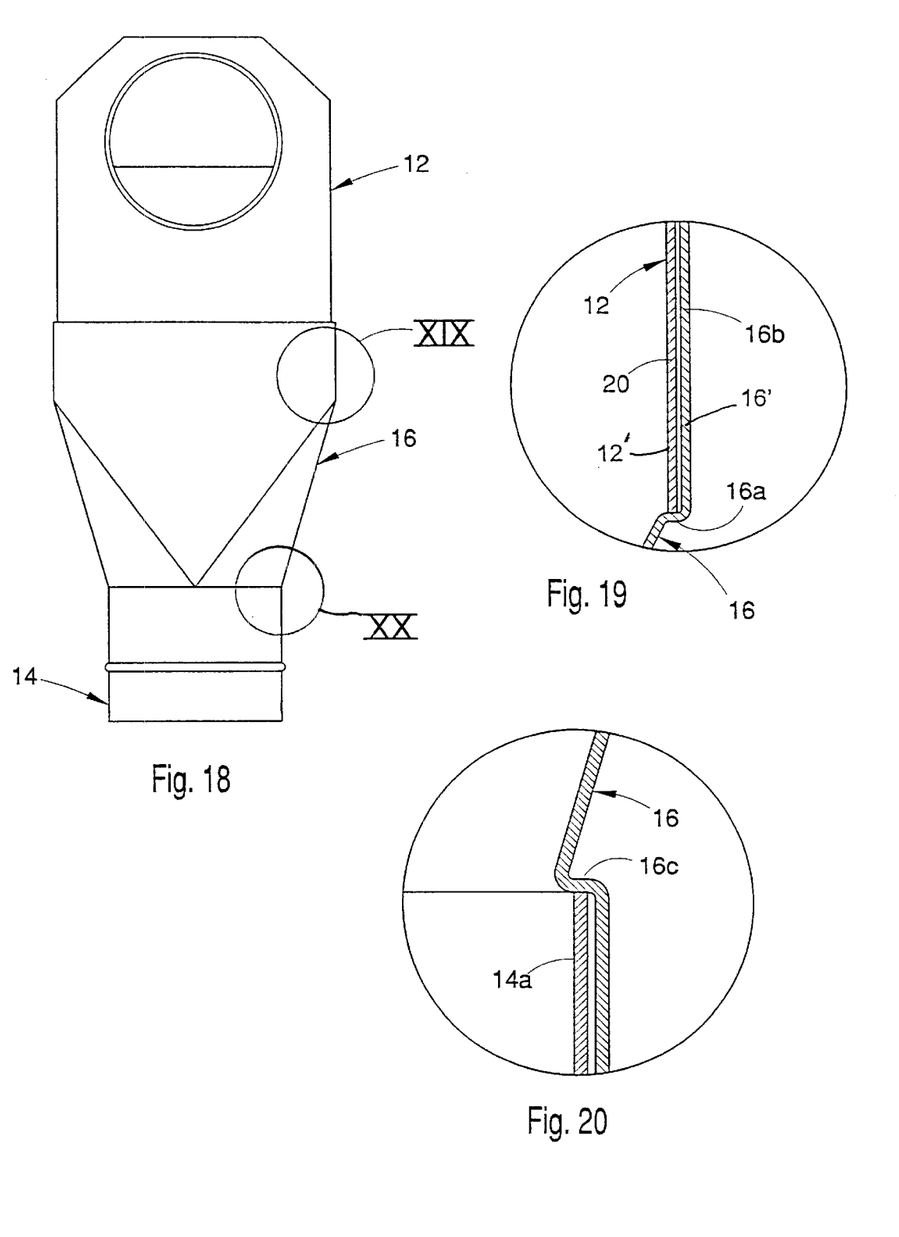
FIG. 18 is comparable to FIG. 10 but with two juncture areas encircled for illustration purposes.
FIG. 19 is a fragmentary, enlarged, sectional view of the area XIX in FIG. 18.
FIG. 20 is a fragmentary, enlarged, sectional view of the area XX in FIG. 18.

Transition segment 16 is shown to be telescopically interfitted with rectangular segment 12. That is, a rectangular projection 16' from segment 16 has an OD that is dimensioned to project into rectangular segment 12 (FIG. 1) with a snug, sliding telescopic interfit. Alternatively, the OD of the end of rectangular segment 12 could be slightly smaller in dimensions to project into the I.D. of projection 16', as depicted in FIGS. 18 and 19.

Segments 14 and 16 could be formed as one piece. The rectangular-to-round segments could be formed of two halves seamed together.

In FIGS. 7–12 is shown an alternative arrangement of the components in the FIG. 1 fitting such that, instead of opening 24 and circular collar 26 being oriented away from the plane containing the central axis of circular segment 14, opening 24 is basically in the plane of the central axis of circular segment 14. Here again, one wall 22 of rectangular segment 12 is basically in the plane containing the central axis of circular segment 14, and the other wall 22 is in alignment with the outer diameter of circular segment 14. This reversibility of the rectangular segment 12 enables opening 24 to be in either of two opposite directions and in two alternative planes to accommodate different installation requirements.

The sliding telescopic interfit between rectangular segment 12 and intermediate transition segment 16 is preferably limited by abutment of one of the walls of one segment against small offset stop shoulders in the other segment. In FIG. 19, the transition segment 16 is shown to have the shoulder 16a at the inner end of outer telescopic wall 16b. Walls 20 and 22 of segment 12 here form the outer sleeve of the sliding telescopic interfit, with the axial end of walls 20 being shown to abut stop shoulders 16a. This not only serves to limit interfit, but also provides a smooth joint to maximize smooth air flow and minimize lint stoppage.

In FIG. 20, round segment 14 is shown to be in sliding telescopic interfit with transition segment 16 by having the axial end of cylindrical wall 14a abut an annular offset shoulder 16c of segment 16. This abutment limits telescopic insertion and provides a smooth joint to minimize lint stoppage.

The novel fitting can be used in various ways in combination with flexible duct, preferably flexible metal duct 40. Thus, two fittings 10 with the lateral opening 24 and collars 26 both oriented outwardly as in FIGS. 13 and 14 can be utilized to connect a dryer D exhaust outlet to a standard tailpipe T in wall W for discharge of air from the dryer. That is, lateral collar 26 of one fitting is interconnected with the dryer while lateral collar 26 of the other fitting is interconnected with the tailpipe, with the rectangular segments 12 being back-to-back. The fittings would be at an angle of about 90° to each other. In this assembly, one wall 22 in the plane of the centerline of round segment 14 is immediately adjacent a like wall 22 of the other fitting 10, the circular segment of each of the fittings being connected to a circular four inch flexible metal duct 40, such that when the components are fully inserted into the dryer outlet and the tailpipe, the total space utilized between the dryer and the wall is just slightly more than the diameter of the flexible duct 40, i.e., slightly more than four inches. The components in FIGS. 13 and 14 are shown not quite fully inserted. The fully inserted assembly enables a close fitting of the dryer to the wall, a particularly advantageous feature in apartments, condominiums or the like where the space allotted for the dryer is small. The assembly in FIGS. 13 and 14 enables optimum hookup of the dryer to the tailpipe even where the two are close together and thus would be difficult to interconnect using conventional fittings as in FIG. 16.

Figure 17:
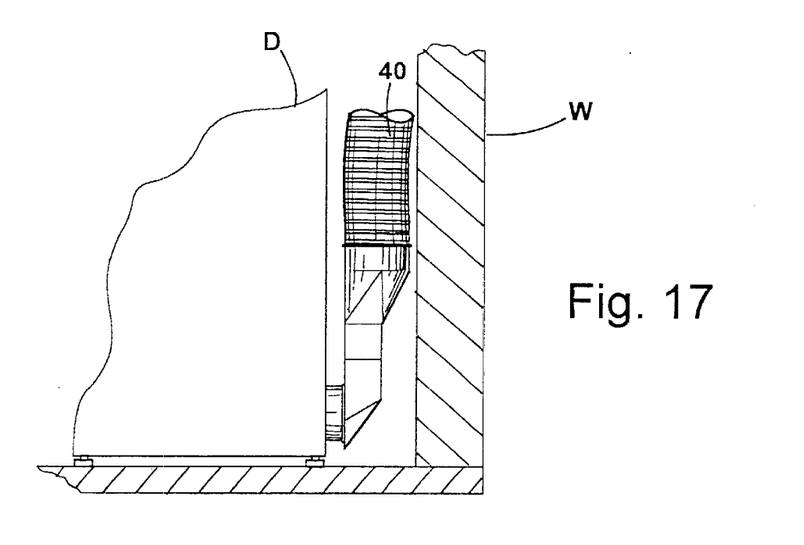
FIG. 17 is a side elevational view of the novel fitting shown as a replacement to a close elbow.

In FIG. 15 is shown a variation wherein a single fitting at the back of the dryer interconnects with a flexible duct 40 which leads to a discharge, e.g., a wall tailpipe which is offset considerably from the outlet of dryer D. In FIG. 17 is shown a variation wherein a single fitting connected to the dryer outlet at the back of dryer D adjacent wall W is attached to duct 40.

The above description is considered that of the preferred embodiments only. Modifications of the invention will occur to those skilled in the art and to those who make or use the invention. Therefore, it is understood that the embodiment(s) shown in the drawings and described above are merely for illustrative purposes and not intended to limit the scope of the invention, which is defined by the following claims as interpreted according to the principles of patent law, including the doctrine of equivalents.

The invention claimed is:

1. A dryer venting system comprising:
   a dryer having an exhaust duct; and
   an air duct fitting comprising:
   rectangular cross section duct segment having a central axis, a round cross section duct segment having a central axis, and a transition rectangle-to-round segment;
   said rectangular cross section duct segment having a lateral round opening with a central axis transverse to said rectangular duct segment central axis; and
   said transition segment being removably intermitted with said rectangular cross section duct segment, whereby said rectangular cross section duct segment round opening can be oriented in either of two opposite directions, the air duct fitting sized so that said transition segment is behind said dryer when the air duct fitting is connected to said dryer exhaust duct.

2. A air duct assembly comprising the air duct fitting in claim 1, said rectangular duct lateral opening being in general alignment with said round duct central axis, and a duct having a round configuration and connected to said round duct segment in air flow relationship.

3. The dryer venting system in claim 1 wherein said rectangular cross section duct segment has an end tapered toward said lateral round opening for change in air flow direction through said fitting.

4. The dryer venting system in claim 1 wherein the air duct fitting is not adjustable in length.

5. An air duct fitting comprising:
   a rectangular cross section duct segment having a central axis a round cross section duct segment having a central axis, and a transition rectangle-to-round segment;

said rectangular cross section duct segment having a lateral round opening with a central axis transverse to said rectangular duct segment central axis;

said round cross section duct segment central axis being laterally offset from and parallel to said rectangular duct segment central axis; and said transition segment being removably interfitted with said rectangular cross section duct segment, whereby said rectangular cross section duct segment round opening can be oriented in either of two opposite directions, one in a plane in general alignment with said round cross section duct segment central axis and the other in a plane laterally offset from said round cross section duct segment central axis, the air duct fitting adapted so that said transition segment is behind a dryer when connected to a dryer exhaust duct.

6. An air duct assembly comprising the air duct fitting in claim 5, said rectangular duct lateral opening being in general alignment with said round duct central axis, and a duct having a round configuration and connected to said round duct segment in air flow relationship, whereby said duct and said air duct fitting require a spacing only wide enough to receive said duct.

7. An air duct assembly comprising a pair of air duct fittings of claim 5, said air duct fittings each having a round lateral opening in a plane laterally offset from the round duct segment central axis of the respective fitting, and the rectangular duct segments of said fittings being in adjacent back-to-back position, and one or more ducts of round cross section interconnecting the two round duct segments of said air duct fittings in air flow relationship.

8. The air duct fitting in claim 5 wherein said rectangular cross section duct segment has an end tapered toward said lateral round opening for change in air flow direction through said fitting.

9. The air duct fitting in claim 5 wherein said rectangular cross section duct segment is about two inches by six inches in cross section and said round cross section duct segment is about four inches in diameter.

10. An air duct fitting comprising:

a rectangular cross section duct segment having a central axis, a round cross section duct segment having a central axis, and a transition rectangle-to-round segment;

said rectangular cross section duct segment having a lateral round opening with a central axis transverse to said rectangular duct segment central axis;

said round cross section duct segment central axis being laterally offset from and parallel to said rectangular duct segment central axis, the air duct fitting adapted so that the air duct fitting is completely behind a dryer when connected to a dryer exhaust duct.

11. An air duct assembly comprising the air duct fitting in claim 10, said rectangular duct lateral opening being in general alignment with said round duct central axis, and a duct having a round configuration and connected to said round duct segment in air flow relationship, whereby said duct and said air duct fitting require a spacing only wide enough to receive said duct.

12. An air duct assembly comprising a pair of air duct fittings of claim 10, said air duct fittings each having a round lateral opening in a plane laterally offset from the round duct segment central axis of the respective fitting, and the rectangular duct segments of said fittings being in adjacent back-to-back position, and one or more ducts of round cross section interconnecting the two round duct segments of said air duct fittings in air flow relationship.

13. The air duct fitting in claim 10 wherein said rectangular cross section duct segment has an end tapered toward said lateral round opening for change in air flow direction through said fitting.

14. The air duct fitting in claim 10 wherein said rectangular cross section segment and said transition rectangle-to-round segment are in telescopic interfit with each other, and wherein one of said rectangular cross section segment and said transition rectangle-to-round segment has an offset stop shoulder and the other has an axial end abutting said stop shoulder.

15. The air duct fitting in claim 14 wherein said transition rectangle-to-round segment has said stop shoulder.

16. The air duct fitting in claim 10 wherein said round cross section segment and said transition rectangle-to-round segment are in telescopic interift with each other, and wherein one of said rectangle-to-round segment and said round cross section segment has an offset stop shoulder, and the other has an axial end abutting said stop shoulder.

17. The air duct fitting in claim 16 wherein said transition rectangle-to-round segment has said stop shoulder.

18. A method of connecting a dryer outlet and a wall tailpipe comprising the steps of:

providing a pair of fittings each having a rectangular cross section duct segment having a central axis, and a transition rectangle-to-round segment, said rectangular cross section duct segment having, a lateral round opening with a central axis transverse to said rectangular duct segment central axis, and said transition segment being removably interfitted with said rectangular cross section duct segment, the tittings adapted to be completely behind a dryer when connected to a dryer outlet;

providing a length of flexible duct;

connecting one of said fittings to a dryer outlet, connecting the other of said fittings to a wall tailpipe, and connecting both of said fittings to said flexible duct.

19. The method in claim 18 wherein said rectangular duct lateral opening is in general alignment with said round duct central axis, and said flexible duct has a round configuration and is connected to said round duct segment in air flow relationship.

20. The method in claim 18 wherein said rectangular cross section duct segment has an end tapered toward said lateral round opening for change in air flow direction through said fitting.

* * * * *

UNITED STATES PATENT AND TRADEMARK OFFICE
CERTIFICATE OF CORRECTION

PATENT NO. : 6,431,611 B1
DATED : August 13, 2002
INVENTOR(S) : John L. Andersen

It is certified that error appears in the above-identified patent and that said Letters Patent is hereby corrected as shown below:

<u>Column 4,</u>
Line 39, before "rectangle" insert -- a --;

<u>Column 6,</u>
Line 41, "tittings" should be -- fittings --;
Line 53, "claim 18" should be -- claim 19 --;

Signed and Sealed this

Fourth Day of February, 2003

JAMES E. ROGAN
*Director of the United States Patent and Trademark Office*